United States Patent
Yu et al.

(10) Patent No.: US 10,671,055 B2
(45) Date of Patent: Jun. 2, 2020

(54) APPARATUS AND METHOD FOR DETERMINING A TARGET ADJUSTMENT ROUTE FOR A PRESET CONTROL CONDITION SET OF A PRODUCTION LINE

(71) Applicant: Institute For Information Industry, Taipei (TW)

(72) Inventors: Cheng-Juei Yu, New Taipei (TW); Yi-Hsin Wu, New Taipei (TW); Yin-Jing Tien, Taipei (TW); Jui-Yu Huang, Taoyuan (TW); Li-Jung Chen, Taipei (TW)

(73) Assignee: Institute For Information Industry, Taipei (TW)

( * ) Notice: Subject to any disclaimer, the term of this patent is extended or adjusted under 35 U.S.C. 154(b) by 92 days.

(21) Appl. No.: 16/184,991

(22) Filed: Nov. 8, 2018

(65) Prior Publication Data
US 2020/0110385 A1 Apr. 9, 2020

(30) Foreign Application Priority Data
Oct. 8, 2018 (TW) .............................. 107135397 A

(51) Int. Cl.
G05B 19/00 (2006.01)
G05B 19/416 (2006.01)

(52) U.S. Cl.
CPC .. G05B 19/416 (2013.01); *G05B 2219/31274* (2013.01); *G05B 2219/32015* (2013.01)

(58) Field of Classification Search
None
See application file for complete search history.

(56) References Cited

U.S. PATENT DOCUMENTS 6,470,229 B1* 10/2002 Wang ...................... H01L 22/20
257/E21.525
2006/0077387 A1* 4/2006 Sato ................. G05B 19/41865
356/394

(Continued)

FOREIGN PATENT DOCUMENTS

| CN | 100468237 C | 3/2009 |
| TW | 200502807 A | 1/2005 |
| TW | 201428647 A | 7/2014 |

OTHER PUBLICATIONS

Office Action to the corresponding Taiwan Patent Application rendered by the Taiwan Intellectual Property Office (TIPO) dated Oct. 16, 2019, 23 pages (including English translation).

*Primary Examiner* — Paul B Yanchus, III
(74) *Attorney, Agent, or Firm* — Skaar Ulbrich Macari, P.A.

(57) ABSTRACT

An apparatus and method for determining a target adjustment route for a preset control condition set of a production line are provided. The apparatus establishes at least one candidate adjustment route for the preset control condition set according to the historical control condition sets. Each candidate adjustment route includes at least one adjustment control condition set arranged in an adjustment order. Each adjustment control condition set is one of the historical control condition sets. Within the same candidate adjustment route, the historical yield related values corresponding to the adjustment control condition sets are all greater than the preset yield related value and increase in the adjustment order. Within the same candidate adjustment route, the numbers of the adjustment control condition(s) included in the adjustment sets increase in the adjustment order. The apparatus selects one of the candidate adjustment route(s) as the target adjustment route.

20 Claims, 8 Drawing Sheets

(56) References Cited

U.S. PATENT DOCUMENTS

2015/0142154 A1 5/2015 Tiano
2017/0255177 A1* 9/2017 Tokuda .............. G05B 19/0426

* cited by examiner

| | Temperature | Pressure | Humidity | Yield rate |
|---|---|---|---|---|
| 10a | 25°C | 80 Pa | 55% | 0.9774 |
| 10b | 30°C | 100 Pa | 50% | 0.9880 |
| | ⋮ | ⋮ | ⋮ | ⋮ |
| 10x | 30°C | 100 Pa | 55% | 0.9750 |

FIG. 1B

| | Temperature | Pressure | Humidity | Yield rate |
|---|---|---|---|---|
| 100 | 25°C | 100 Pa | 55% | 0.9437 |

FIG. 1C

APPARATUS AND METHOD FOR DETERMINING A TARGET ADJUSTMENT ROUTE FOR A PRESET CONTROL CONDITION SET OF A PRODUCTION LINE

PRIORITY

This application claims priority to Taiwan Patent Application No. 107135397 filed on Oct. 8, 2018, which is hereby incorporated by reference in its entirety.

FIELD

The present invention relates to an apparatus and a method for determining a target adjustment route for a preset control condition set of a production line. More particularly, the present invention relates to an apparatus and a method for determining a stepwise advanced target adjustment route for a preset control condition set of a production line.

BACKGROUND

For manufacturing industries, it is an important issue to decide actual control conditions (e.g., values, ranges, options, or the like) of various control factors (e.g., temperature, pressure, humidity, or the like) of a production line in order to improve yield related values (e.g., improve the yield and increase the yield rate). When there is a need in manufacturing new products, the manufacturers must set appropriate control conditions for the control factors of the production line. Moreover, during the process of manufacturing of the products, the manufacturers also need to timely evaluate whether the current control conditions of the control factors need to be adjusted. A production line usually involves multiple control factors, and various control conditions corresponding to the control factors form complicated control combinations, which makes the manufacturer hard to make a decision when setting the control conditions for the control factors.

Currently, many manufacturers rely on the experiences of the experienced practitioners for setting the control conditions of the control factors. This approach extremely depends on the experiences and does not evaluate the actual effect of each control factor on the yield related values of the production line objectively and comprehensively. Hence, the yield related values can only be improved after many times of adjustment. Some manufacturers design an experimental method (e.g., Taguchi method and response surface method) and obtain an optimal control condition set (including the control conditions of all the control factors) after many experiments. However, applying the optimal control condition set to an on-site production line is usually infeasible. For example, the control conditions that can be set for the control factors of an on-site production line are often restricted in range, variation amount, and/or adjustability. If the control condition(s) corresponding to some control factor(s) in the optimal control condition set cannot comply with the restriction, the optimal control condition set cannot be applied to the on-site production line.

In addition to the aforesaid drawbacks, when deciding/adjusting the control condition set to be adopted the production line, the conventional technology does not consider the cost and the benefits of adjusting the control factors and nor does it consider the burden on the production line if adjusting too many control factors at one time. Accordingly, it is an important task to efficiently decide and/or correct the control condition set (i.e., decide and/or correct the control conditions of the control factors) that can be actually applied to the production line and decide the adjustment order while taking all the aforesaid factors into consideration in order to improve the yield related values and gradually achieve the production target.

SUMMARY

In order to solve the aforesaid problems in deciding/adjusting an appropriate control condition set for a plurality of control factors of a production line, provided is an apparatus and a method for determining a target adjustment route for a preset control condition set of a production line.

The apparatus for determining a target adjustment route for a preset control condition set of a production line can comprise a storage and a processor, wherein the storage is electrically connected to the processor. The storage stores a preset control condition set and a plurality of historical control condition sets. The preset control condition set comprises a preset yield related value and a plurality of preset control conditions which correspond to a plurality of control factors one-to-one. Each of the historical control condition sets comprises a historical yield related value and a plurality of historical control conditions which correspond to the control factors one-to-one. The processor establishes at least one candidate adjustment route for the preset control condition set according to the historical control condition sets, wherein each of the at least one candidate adjustment route includes at least one adjustment control condition set arranged in an adjustment order, and each of the at least one adjustment control condition set is one of the historical control condition sets.

Moreover, the historical yield related value corresponding to the first adjustment control condition set of each of the at least one candidate adjustment route is greater than the preset yield related value, and the historical yield related values corresponding to the adjustment control condition sets within the same candidate adjustment route increase in the adjustment order. Each of the at least one adjustment control condition set of each of the at least one candidate adjustment route has an adjustment set with respect to the preset control condition set. The at least one historical control condition included in each of the adjustment sets is different from the at least one preset control condition corresponding to the adjustment set. The adjustment set of each of the adjustment control condition sets is a proper subset of the adjustment set of the next adjustment control condition set in the same first candidate adjustment route. The processor further selects one of the at least one candidate adjustment route as the target adjustment route.

The method for determining a target adjustment route for a preset control condition set of a production line can be adapted for use in an electronic apparatus. The electronic apparatus stores the preset control condition set and a plurality of historical control condition sets. The preset control condition set comprises a preset yield related value and a plurality of preset control conditions which correspond to a plurality of control factors one-to-one. Each of the historical control condition sets comprises a historical yield related value and a plurality of historical control conditions which correspond to the control factors one-to-one. The method comprises the following steps (a) and (b).

The step (a) establishes at least one candidate adjustment route for the preset control condition set according to the historical control condition sets, wherein each of the at least one candidate adjustment route includes at least one adjustment control condition set arranged in an adjustment order, and each of the at least one adjustment control condition set is one of the historical control condition sets. The historical yield related value corresponding to the first adjustment control condition set of each of the at least one candidate adjustment route is greater than the preset yield related value, and the historical yield related values corresponding to the adjustment control condition sets within the same candidate adjustment route increase in the adjustment order. Moreover, each of the at least one adjustment control condition set of each of the at least one candidate adjustment route has an adjustment set with respect to the preset control condition set, the at least one historical control condition included in each of the adjustment sets is different from the at least one preset control condition corresponding to the adjustment set, and the adjustment set of each of the adjustment control condition sets is a proper subset of the adjustment set of the next adjustment control condition set in the same candidate adjustment route. The step (b) selects one of the at least one candidate adjustment route as the target adjustment route.

The present invention establishes at least one candidate adjustment route complying with two conditions for a preset control condition set according to a plurality of historical control condition sets. According to the first condition, the historical yield related value corresponding to the first adjustment control condition set of each of the at least one candidate adjustment route is greater than the preset yield related value, and the historical yield related values corresponding to the adjustment control condition sets within the same candidate adjustment route increase in the adjustment order. According to the second condition, each of the at least one adjustment control condition set of each of the at least one candidate adjustment route has an adjustment set with respect to the preset control condition set, the at least one historical control condition included in each of the adjustment sets is different from the at least one preset control condition corresponding to the adjustment set, and the adjustment set of each of the adjustment control condition sets is a proper subset of the adjustment set of the next adjustment control condition set in the same candidate adjustment route. After establishing the candidate adjustment routes complying with the aforesaid conditions, the present invention is able to select one of the candidate adjustment routes as the target adjustment route according to different strategies.

With the first condition, no matter which candidate adjustment route is selected, the yield related values of the production line will be gradually improved by adjusting the control factors gradually according to the adjustment order formed by the at least one adjustment control condition included in the candidate adjustment route. With the second condition, no matter which candidate adjustment route is selected, the control factors of the production line can be adjusted gradually by adjusting one or few control factors each time. By the aforesaid mechanism, the present invention can select a target adjustment route for adjusting the preset control condition set of the production line under the consideration of the cost and the benefit. By adjusting the control factors of the production line to the corresponding adjustment control conditions according to an adjustment order formed by the at least one adjustment control condition included in the target adjustment route, the yield related values of the production line will be improved gradually, and the huge burden on the production line caused by adjusting too many control factors at one time can be avoided.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1B illustrates a specific example of a historical control condition set according to the present invention;

FIG. 1C illustrates a specific example of a preset control condition set according to the present invention;

DETAILED DESCRIPTION

In the following description, an apparatus and a method for determining a target adjustment route for a preset control condition set of a production line (i.e., determining an adjustment order and the objective control conditions for a plurality of preset control conditions corresponding to a plurality of control factors of a production line) will be explained with reference to certain example embodiments thereof. However, these example embodiments are not intended to limit the present invention to any specific embodiment, example, environment, applications, or particular implementations described in these example embodiments. Therefore, description of these example embodiments is only for purpose of illustration rather than to limit the scope of the present invention.

It shall be appreciated that, in the following embodiments and the attached drawings, elements unrelated to the present invention are omitted from depiction; and dimensions of and dimensional relationships among individual elements in the attached drawings are provided only for illustration, but not to limit the scope of the present invention.

Figure 1A:
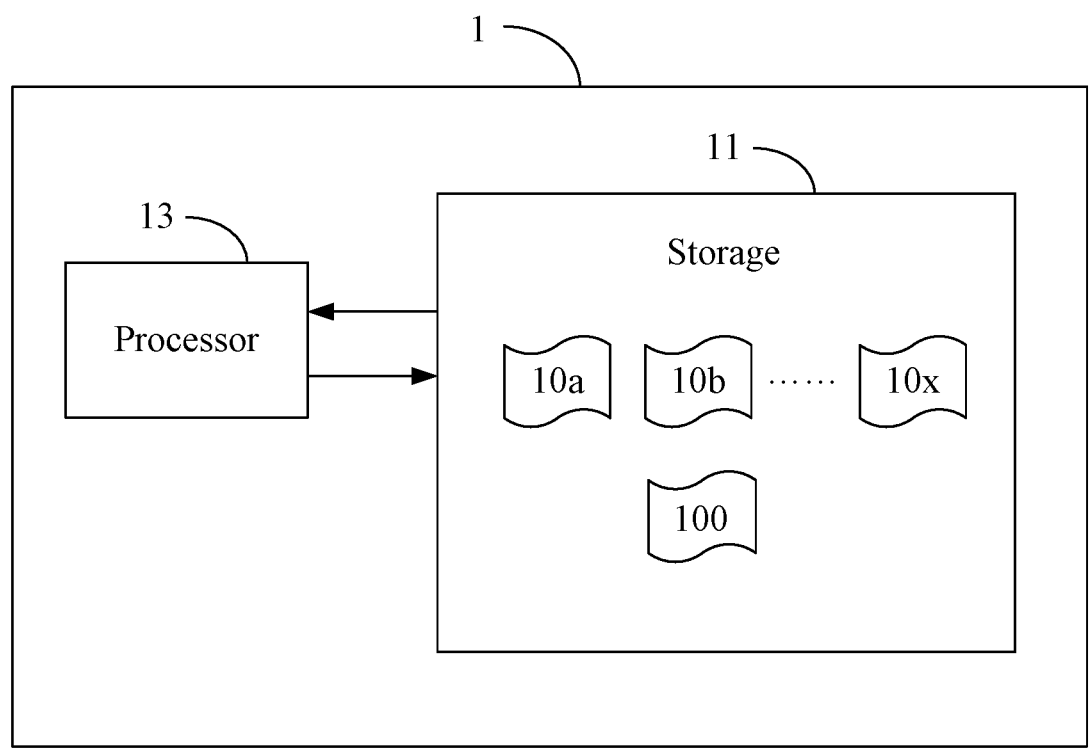
FIG. 1A is a schematic view according to a first embodiment of the present invention.

A first embodiment of the present invention is an apparatus 1 for determining a target adjustment route for a preset control condition set of a production line (hereinafter referred to as "determination apparatus 1"), whose schematic view is depicted in FIG. 1A. The determination apparatus 1 comprises a storage 11 and a processor 13, and the storage 11 is electrically connected with the processor 13. The storage 11 may be one of a hard disk drive (HDD) (e.g., a conventional hard disk, a solid hard disk), a universal serial bus (USB), a compact disk (CD), or any other non-transitory storage media or apparatuses with the same function and well known to those of ordinary skill in the art. The processor 13 may be one of various processing units, central processing units (CPU), microprocessors, digital signal processors (DSP), or any other computing apparatuses with the same function and well known to those of ordinary skill in the art.

Yield related values (e.g., yield, yield rate, production rate, but not limited thereto) of a production line may serve as a standard for measuring the quality of the production line. Yield related values of a production line are influenced by control conditions (e.g., values, ranges, options, or the like, but not limited thereto) set for a plurality of control factors (e.g., temperature, humidity, pressure, the number of machines, various time parameters, but not limited thereto). For convenience, the control conditions used for producing a batch of products by a production line may be called a control condition set in the specification and the claims of this application.

In this embodiment, the storage 11 stores a plurality of historical control condition sets 10a, 10b, . . . , 10x, and each of the historical control condition sets 10a, 10b, . . . , 10x comprises a historical yield related value and a plurality of historical control conditions corresponding to a plurality of control factors of the production line one-to-one. For comprehension, please refer to a specific example shown in FIG. 1B. The specific example will be used in the subsequent description, which, however, is not intended to limit the scope of the present invention. In this specific example, each of the historical control condition sets 10a, 10b, . . . , 10x comprises three historical control conditions corresponding to three control factors (i.e., temperature, humidity, and pressure) of the production line one-to-one and a historical yield related value. For example, the historical control condition set 10a comprises three historical control conditions (i.e., 25° C., 80 Pa, and 55%) corresponding to three control factors (i.e., temperature, humidity, and pressure) one-to-one and a historical yield related value (i.e., a yield rate of 0.9774). Please note that the historical control condition sets 10a, 10b, . . . , 10x may be values used by the same production line for producing products previously or may be values used by other production lines when producing the same type of products. The way to obtain the historical control condition sets 10a, 10b, . . . , 10x is not limited in the present invention and how to obtain the historical control condition sets 10a, 10b, . . . , 10x is not the focus of the present invention and, thus, the details will not be further described herein.

Moreover, the storage 11 further stores a preset control condition set 100, which comprises a preset yield related value and a plurality of preset control conditions corresponding to the control factors of the production line one-to-one. Please note that the preset control condition set 100 may be the control condition set that is currently adopted by the production line for manufacturing the products or the control condition set that is to be adopted by the production line. Please refer to an exemplary preset control condition set 100 shown in FIG. 1C, which will be used for the subsequent description. It is noted that this exemplary preset control condition set 100 is not intended to limit the scope of the present invention. The preset control condition set 100 comprises three preset control conditions (i.e., 25° C., 100 Pa, and 55%) corresponding to three control factors (i.e., temperature, humidity and pressure) one-to-one and a preset yield related value (i.e., a yield rate of 0.9437).

It shall be appreciated that, in the present invention, each control condition of each control condition set may a specific value (e.g., 25° C.), may be a range (e.g., ranging from 10° C. to 15° C.), or may be one of multiple options (e.g., when the control factor is a material and has options including metal, glass, and plastic, the control condition may be metal). It shall be also appreciated that the number and the type of the control factors as well as expressions of various control conditions are not limited in the present invention.

Figure 1D:
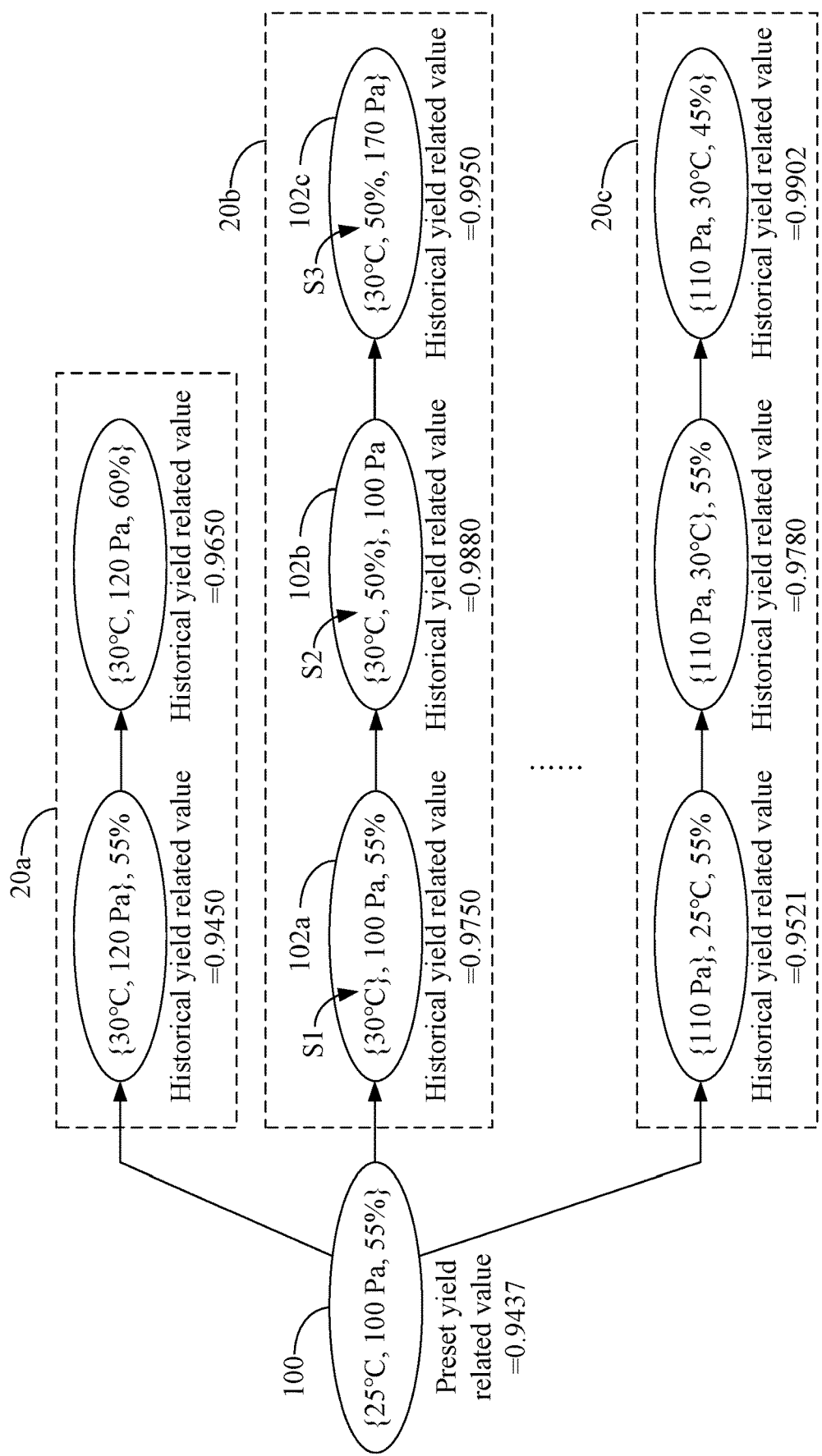
FIG. 1D illustrates a specific example of a candidate adjustment route according to the present invention.

Please refer to FIG. 1D as well. In this embodiment, before or during manufacturing a certain type of products by a production line, the processor 13 will establish a plurality of candidate adjustment routes 20a, 20b, . . . , 20c for the preset control condition set 100 according to the historical control condition sets 10a, 10b, . . . , 10x and then select one of the candidate adjustment routes 20a, 20b, . . . , 20c as a target adjustment route of the preset control condition set 100. In some embodiments, after the target adjustment route is selected by the processor 13, the determination apparatus 1 adjusts the control factors of the production line to the corresponding adjustment control conditions according to an adjustment order of an adjustment control condition set included in the target adjustment route (e.g., the processor 13 generates one or more instruction signals and then transmits the one or more instruction signals to the corresponding machine via a transceiving interface so that the machine can adjust accordingly). In some embodiments, after the target adjustment route is selected by the processor 13, the determination apparatus 1 outputs the target adjustment route (e.g., displays the target adjustment route on a display apparatus) so that an administrator can adjust the control factors of the production line accordingly. The operations of this embodiment will be detailed with reference to the specific example shown in FIG. 1D, but it shall be appreciated that the specific example is not intended to limit the scope of the present invention.

In this embodiment, the processor 13 establishes all the possible candidate adjustment routes 20a, 20b, . . . , 20c for the preset control condition set 100 according to the historical control condition sets 10a, 10b, . . . , 10x. Each of the candidate adjustment routes 20a, 20b, . . . , 20c comprises at least one adjustment control condition set arranged in an adjustment order, and each of the at least one adjustment control condition set is one of the historical control condition sets 10a, 10b, . . . , 10x. The adjustment order formed by the at least one adjustment control condition set included in a candidate adjustment route (for simplicity, it may be called the adjustment order of the candidate adjustment route) represents an adjustment order of the control factors suggested by the processor 13.

For example, the candidate adjustment route 20b comprises three adjustment control condition sets 102a, 102b, and 102c, and each of the adjustment control condition sets 102a, 102b, and 102c is one of the historical control condition sets 10a, 10b, . . . , 10x. The adjustment order of the candidate adjustment route 20b is the adjustment control condition set 102a, the adjustment control condition set 102b, and the adjustment control condition set 102c in sequence (as shown by the arrow in FIG. 1D), which means that the processor 13 suggests adjusting the preset control condition set 100 according to this adjustment order. In other words, the processor 13 suggests adjusting the preset control condition set 100 to be consistent with the adjustment control condition set 102a (i.e., only the control factor "temperature" is adjusted) first, then be consistent with the control condition set 102b (i.e., the control factor "humidity" is then adjusted), and finally be consistent with the adjustment control condition set 102c (i.e., the control factor "pressure" is finally adjusted).

It is emphasized that the candidate adjustment routes 20a, 20b, . . . , 20c established by the processor 13 must comply with the following two conditions.

According to the first condition, the historical yield related value corresponding to the first adjustment control condition set of each of the candidate adjustment routes 20a, 20b, . . . , 20c should be greater than the preset yield related value, and the historical yield related values corresponding to the adjustment control condition sets within the same candidate adjustment route increase in the adjustment order. With the first condition, no matter which candidate adjustment route is selected as the target adjustment route, the yield related values of the production line will be gradually improved by adjusting the control factors according to the adjustment order of the candidate adjustment route.

For comprehension, the candidate adjustment route 20b of FIG. 1D is taken as an example for illustration. The historical yield related value (i.e., a yield rate of 0.9750) corresponding to the first adjustment control condition set 102a of the candidate adjustment routes 20b is greater than the preset yield related value (i.e., a yield rate of 0.9437). Moreover, the historical yield related values (i.e. yield rates of 0.9750, 0.9880, and 0.9950) corresponding to the adjustment control condition sets 102a, 102b, and 102c within the candidate adjustment route 20b increase in the adjustment order.

According to the second condition, each of the at least one adjustment control condition set of each of the candidate adjustment routes 20a, 20b, . . . , 20c has an adjustment set with respect to the preset control condition set 100, the at least one historical control condition included in each of the adjustment sets is different from the at least one preset control condition corresponding to the adjustment set, and the adjustment set of each of the adjustment control condition sets is a proper subset of the adjustment set of the next adjustment control condition set in the same candidate adjustment route. With the second condition, no matter which candidate adjustment route is selected as the target adjustment route, the control factors of the production line will be adjusted gradually, wherein one or few more control factors are adjusted each step.

For comprehension, the candidate adjustment route 20b of FIG. 1D is taken as an example for illustration. The adjustment control condition sets 102a, 102b, and 102c of the candidate adjustment route 20b respectively have an adjustment set S1, S2, and S3 with respect to the preset control condition set 100. The adjustment set S1 has one historical control condition (i.e., 30□), which is different from the preset control condition that corresponds to the adjustment set S1 (i.e., the preset control condition that corresponds to the same control factor, which is of 25□). The adjustment set S2 has two historical control conditions (i.e., 30□, 50%), which are different from the preset control conditions that correspond to the adjustment set S2 (i.e., the preset control conditions that correspond to the same control factors, which are of 25□ and 55%). The adjustment set S1 is a proper subset of the adjustment set S2, which means that at least one more control factor is further adjusted by moving from the adjustment control condition set 102a to the adjustment control condition set 102b. The adjustment set S3 has three historical control conditions (i.e., 30□, 50%, 170 Pa), which are different from the preset control conditions that correspond to the adjustment set S3 (i.e., the preset control conditions that correspond to the same control factors, which are of 25□, 55%, and 100 Pa). The adjustment set S2 is a proper subset of the adjustment set S3, which means that at least one more control factor is further adjusted by moving from the adjustment control condition set 102b to the adjustment control condition set 102c.

In this embodiment, after the processor 13 establishes the candidate adjustment routes 20a, 20b, . . . , 20c complying with the aforesaid two conditions for the preset control condition set 100 according to the historical control condition sets 10a, 10b, . . . , 10x, the processor 13 arbitrarily selects one from the candidate adjustment routes 20a, 20b, . . . , 20c as the target adjustment route.

In some embodiments, the processor 13 selects the target adjustment route from the candidate adjustment routes 20a, 20b, . . . , 20c according to a target condition so that the historical yield value corresponding to the last adjustment control condition set of the selected target adjustment route complies with the target condition.

For example, the target condition may be the largest historical yield related value (which means that the objective is to select a target adjustment route that can maximize the preset yield related value). Under such target condition, the processor 13 will select the candidate adjustment route whose last adjustment control condition set corresponds to the largest historical yield related value as the target adjustment route. In the example of FIG. 1D, if the target condition is "the largest historical yield related value," the processor 13 will select the candidate adjustment route 20b as the target adjustment route. As another example, the target condition may be a historical yield related value with a specific value or within a specific range. Under such target condition, the processor 13 will select the candidate adjustment route whose last adjustment control condition set corresponds to a historical yield related value with the specific value or within the specific range as the target adjustment route.

A person having ordinary skill in the art may determine the target condition depending on a production objective to be achieved by the production line. In some embodiments, the preset/historical yield related values may be the yield rate and/or the yield of the production line for manufacturing the products, so the target condition may be the yield rate and/or the yield to be achieved by the production line. Please note that the preset/historical yield related values of the present invention are not limited to yield rate and yield. In other words, the preset/historical yield related values may be other measuring indexes (e.g., the production rate) for measuring the production line for manufacturing the products as long as a larger measuring index represents better performance of the production line.

In some embodiments, the processor 13 may calculate an adjustment benefit of each of the candidate adjustment routes 20a, 20b, . . . , 20c and then select the target adjustment route from the candidate adjustment routes 20a, 20b, . . . , 20c by finding out the one whose adjustment benefit complies with the target condition.

In some embodiments, the processor 13 may calculate an adjustment benefit of each of the candidate adjustment routes 20a, 20b, . . . , 20c according to the preset yield related value, the historical yield related value corresponding to the last adjustment control condition set of each of the candidate adjustment routes 20a, 20b, . . . , 20c, and an adjustment cost of each of the candidate adjustment routes 20a, 20b, . . . , 20c.

In some embodiments, the processor 13 may calculate a degree of improvement of each of the candidate adjustment routes 20a, 20b, . . . , 20c according to the preset yield related value and the historical yield related value corresponding to the last adjustment control condition set of each of the candidate adjustment routes 20a, 20b, . . . , 20c and then calculate an adjustment benefit of each of the candidate adjustment routes 20a, 20b, 20c according to the degree of improvement and the adjustment cost of each of the candidate adjustment routes 20a, 20b, . . . , 20c. In some embodiments, the processor 13 may calculate the adjustment cost according to the number of the control factors of the adjustment set (i.e., the number of the historical control conditions included in the adjustment set) of the last adjustment control condition set of each of the candidate adjustment routes 20a, 20b, ..., 20c. For example, the processor 13 may calculate the adjustment benefit of each of the candidate adjustment routes 20a, 20b, ..., 20c according to the following equation (1). Please note that the equation (1) is not intended to limit the scope of the present invention:

$$B_i = \frac{Y_i - Y}{Y} - \frac{N_i}{N} \qquad (1)$$

In the aforesaid equation (1), the parameter $B_i$ represents the adjustment benefit of the $i^{th}$ candidate adjustment route, the parameter Y represents the preset yield related value, the parameter $Y_i$ represents the historical yield related value corresponding to the last adjustment control condition set of the $i^{th}$ candidate adjustment route, the parameter N represents the number of the control factors, and the parameter $N_i$ represents the number of the control factors of the adjustment set of the last adjustment control condition set of the $i^{th}$ candidate adjustment route. In the aforesaid equation, the value of $$\frac{Y_i - Y}{Y}$$

may be regarded as the degree of improvement of the $i^{th}$ candidate adjustment route, and the value of $$\frac{N_i}{N}$$

may be regarded as the adjustment cost of the $i^{th}$ candidate adjustment route.

In some embodiments, the processor 13 calculates the adjustment benefit by taking all the adjustment control condition sets included in each of the candidate adjustment routes 20a, 20b, ..., 20c into consideration. Specifically, the processor 13 performs the following operations on each of the candidate adjustment routes 20a, 20b, ..., 20c: (a) calculating an adjustment sub-benefit for each of the at least one adjustment control condition set of the candidate adjustment route and (b) summing up the at least one adjustment sub-benefit as an adjustment benefit. Taking the candidate adjustment route 20b of FIG. 1D as an example, the processor 13 calculates the adjustment sub-benefit of the adjustment control condition set 102a (which represents the adjustment sub-benefit of adjusting from the preset control condition set 100 to the adjustment control condition set 102a), calculates the adjustment sub-benefit of the adjustment control condition set 102b (which represents the adjustment sub-benefit of adjusting from the preset control condition set 102a to the adjustment control condition set 102b), calculates the adjustment sub-benefit of the adjustment control condition set 102c (which represents the adjustment sub-benefit of adjusting from the preset control condition set 102b to the adjustment control condition set 102c), and sums up the adjustment sub-benefits as the adjustment benefit of the candidate adjustment route 20b.

In some embodiments, each of the aforesaid adjustment sub-benefits is related to the historical yield related value and/or an adjustment cost of the corresponding adjustment control condition set. For example, when calculating each of the adjustment sub-benefits, the processor 13 may calculate a degree of improvement according to the corresponding adjustment control condition and then calculate the adjustment sub-benefit according to the degree of improvement and the adjustment cost of the corresponding adjustment control condition. Taking the adjustment control condition set 102b in the candidate adjustment route 20b of FIG. 1D as an example, the processor 13 calculates the degree of improvement and the adjustment cost of adjusting from the adjustment control condition set 102a to the adjustment control condition set 102b and then calculates the adjustment sub-benefit of adjusting from the adjustment control condition set 102a to the adjustment control condition set 102b based on the degree of improvement and the adjustment cost. It shall be appreciated that, in some embodiments, the adjustment cost of each of the adjustment control condition sets in a candidate adjustment route corresponds to a cost function (i.e., is calculated according to a cost function), and the cost functions are not all the same. In other words, the processor 13 may consider different cost factors when calculating the adjustment cost of different adjustment control condition sets on a candidate adjustment route.

According to the above descriptions, the determination apparatus 1 determines a target adjustment route for a preset control condition set 100 of a production line by using a plurality of historical control condition sets 10a, 10b, ..., 10x. Briefly speaking, the determination apparatus 1 establishes a plurality of candidate adjustment routes 20a, 20b, ..., 20c complying with special conditions for a preset control condition set 100 according to the historical control condition sets 10a, 10b, ..., 10x, wherein each of the candidate adjustment routes 20a, 20b, ..., 20c comprises at least one adjustment control condition set arranged in an adjustment order. After establishing the candidate adjustment routes 20a, 20b, ..., 20c, the determination apparatus 1 may select one of the candidate adjustment routes 20a, 20b, ..., 20c as the target adjustment route according to different strategies.

By the aforesaid technical means, the present invention can select a target adjustment route for adjusting the preset control condition set 100 of the production line under the consideration of the cost and the benefit of adjusting the control factors and then gradually adjust the control factors of the production line to the corresponding control conditions according to an adjustment order of the target adjustment route. In this way, the yield related values of the production line will be improved gradually and the huge burden on the production line caused by adjusting too many control factors at one time can be avoided.

Please also refer to FIG. 1A to FIG. 1D for a second embodiment of the present invention. Most operations of the second embodiment are generally the same as those of the first embodiment. Nevertheless, in the second embodiment, the processor 13 determines whether a candidate adjustment route complies with a target condition every time a candidate adjustment route is established. If the candidate adjustment route complies with the target condition, then the processor 13 selects the candidate adjustment route as the target adjustment route. If the candidate adjustment route does not comply with the target condition, the processor 13 establishes another candidate adjustment route and then determines whether the another candidate adjustment route comply with the target condition. The processor 13 repeats the aforesaid operations until a candidate adjustment route complying with the target condition is found and determined as the target adjustment route.

For example, if the target condition is "the historical yield related value being greater than 0.96," the processor 13 determines whether the historical yield related value (i.e., 0.9650) corresponding to the last control condition set of the candidate adjustment route 20a complies with the target condition right after establishing the candidate adjustment route 20a. Because the historical yield related value (i.e., 0.9650) corresponding to the last control condition set of the candidate adjustment route 20a is greater than the target condition, the processor 13 selects the candidate adjustment route 20a as the target adjustment route. In this case, the processor 13 will not establish other candidate adjustment routes 20b, . . . , 20c.

According to the above descriptions, a person having ordinary skill in the art shall understand how the second embodiment implements other operations described in the first embodiment in order to have the same function and achieve the same technical effect and, thus, the details will not be further described herein.

Please refer to FIG. 1B to FIG. 1D and FIG. 2A to FIG. 2B for a third embodiment of the present invention. The third embodiment may be regarded as the extension of the first embodiment and the second embodiment.

Figure 2A:
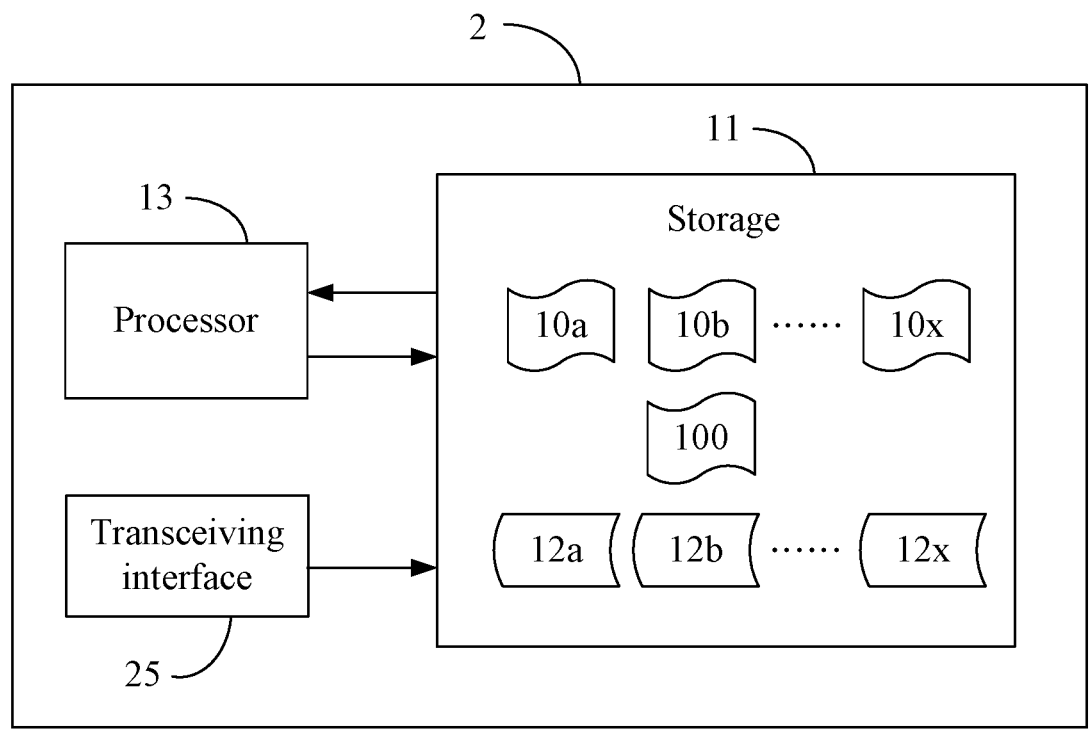
FIG. 2A is a schematic view of the determination apparatus 2 according to a third embodiment of the present invention.
Figure 2B:
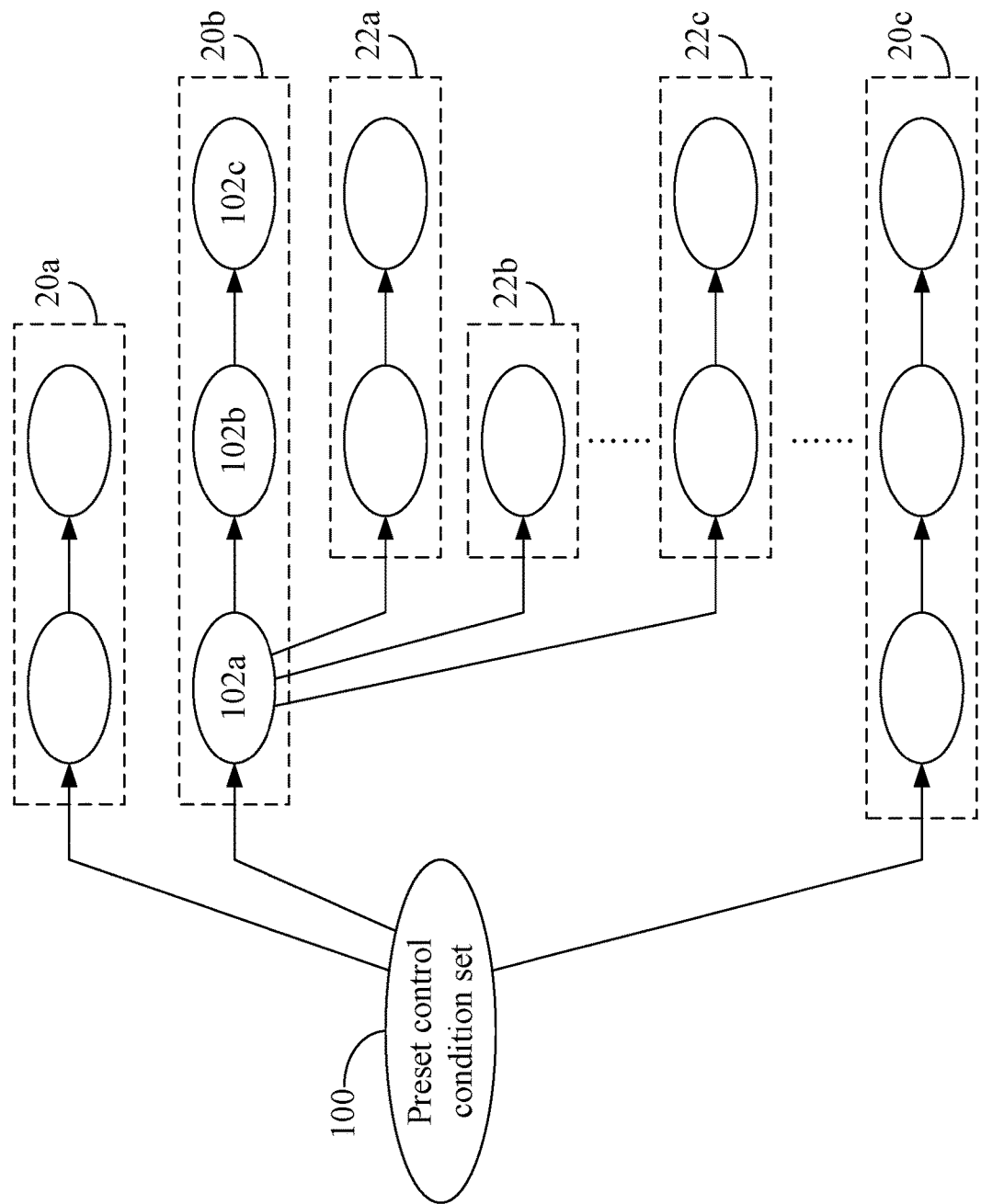
FIG. 2B illustrates the candidate adjustment routes for a selected adjustment control condition set according to the present invention.

FIG. 2A is a schematic view of an apparatus 2 for determining a target adjustment route for a preset control condition set of a production line (hereinafter referred to as "determination apparatus 2") according to this embodiment. The determination apparatus 2 comprises the aforesaid storage 11, the aforesaid processor 13, and a transceiving interface 25. Operations, functions, and effects that can be executed and achieved by the storage 11 and the processor 13 are the same as the aforesaid two embodiments and, thus, will not be repeated herein. The transceiving interface 25 is electrically connected to the processor 13, wherein the transceiving interface 25 may be a signal transceiver or other interfaces that are capable of transceiving digital data.

In this embodiment, the transceiving interface 25 will continuously (e.g., periodically) receive other historical control condition sets (e.g., a plurality of historical control condition sets 12a, 12b, . . . , 12x), and these other historical control condition sets will be added into the storage 11 under the instruction of the processor 13.

As mentioned, this embodiment is the extension of the first embodiment and the second embodiment. Herein, it is assumed that the processor 13 has selected the candidate adjustment route 20b from the candidate adjustment routes 20a, 20b, . . . , 20c as the target adjustment route. Moreover, it is assumed that the processor 13 has adjusted the control factor of the production line according to a selected adjustment control condition set (e.g., the adjustment control condition set 102a) of the target adjustment route (e.g., the target adjustment route 20b), but has not adjusted other control factors of the production line according to other adjustment control condition sets (e.g., the adjustment control condition sets 102b and 102c) of the target adjustment route.

In this embodiment, the processor 13 determines that the content of the storage 11 has been updated after adjusting the control factors of the production line according to the selected adjustment control condition set (e.g., the adjustment control condition set 102a) Therefore, the processor 13 establishes at least one candidate adjustment route 22a, 22b, . . . , 22c for the selected adjustment control condition set according to the historical control condition sets 10a, 10b, . . . , 10x and the historical control condition sets 12a, 12b, . . . , 12x and selects one of the candidate adjustment routes 22a, 22b, . . . , 22c as the target adjustment route of the selected adjustment control condition set.

It shall be appreciated that the candidate adjustment routes 22a, 22b, . . . , 22c that the processor 13 has established for the selected adjustment control condition set have to comply with the two conditions described in the first embodiment. Moreover, the processor 13 may adopt the various mechanisms/strategies described in the first embodiment to select the target adjustment route for the selected adjustment control condition set from the candidate adjustment routes 22a, 22b, . . . , 22c. Please also note that the number of times for updating the target adjustment routes of the production line is not limited in the present invention. A person of ordinary skill in the art shall understand how the present invention update the target adjustment route of the production line once or several times based on the aforesaid operations and, thus, will not be further described herein.

Figure 3A:
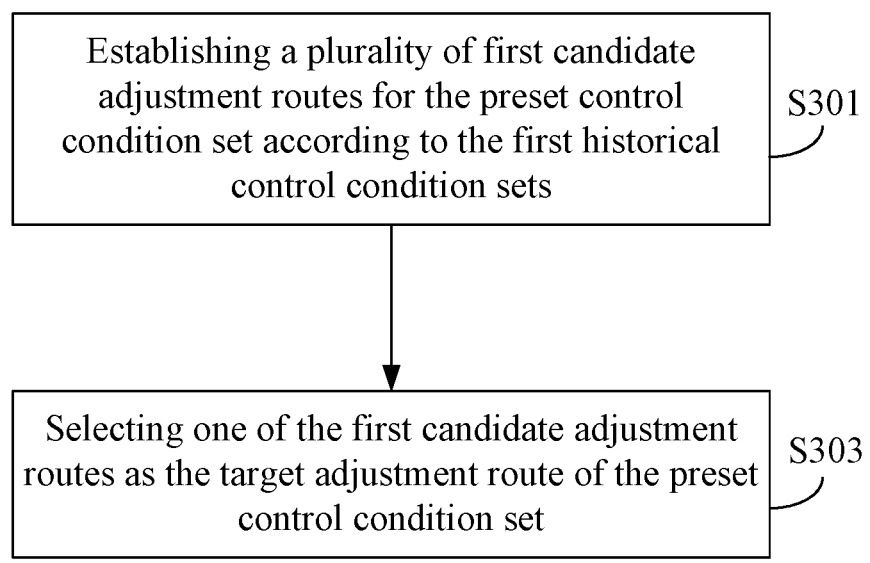
FIG. 3A is a flowchart depicting a fourth embodiment of the present invention.

A fourth embodiment of the present invention is a method for determining a target adjustment route for a preset control condition set of a production line (hereinafter referred to as "determination method") and a flowchart thereof is depicted in FIG. 3A. The determination method is for use in an electronic apparatus, e.g., the determination apparatus 1 described in the first and the second embodiments and the determination apparatus 2 described in the third embodiment.

In this embodiment, the electronic apparatus stores a plurality of first historical control condition sets (e.g., the historical control condition sets 10a, 10b, . . . , 10x shown in FIG. 1A), wherein each of the first historical control condition sets comprises a historical yield related value and a plurality of historical control conditions which correspond to a plurality of control factors one-to-one. Moreover, the electronic apparatus stores a preset control condition set (e.g., the preset control condition set 100 shown in FIG. 1A), wherein the preset control condition set comprises a preset yield related value and a plurality of preset control conditions which correspond to a plurality of control factors one-to-one. The preset control condition set may be the control condition set that is adopted currently by the production line for manufacturing the products and may also be a control condition set that is going to be adopted by the production line. The preset/historical yield related values may be the yield rate and/or the yield of the production line for manufacturing the products, but they are not limited thereto.

First, in step S301, the electronic apparatus establishes a plurality of first candidate adjustment routes (e.g., the candidate adjustment routes 20a, 20b, . . . , 20c shown in FIG. 1D) for the preset control condition set according to the first historical control condition sets, wherein each of the first candidate adjustment routes includes at least one adjustment control condition set arranged in an adjustment order (e.g., the three adjustment control condition sets 102a, 102b, and 102c shown in FIG. 1D) and each of the at least one adjustment control condition set is one of the first historical control condition sets. It shall be appreciated that each of the first candidate adjustment routes established for the preset control condition set in the step S301 must comply with the two conditions described in the first embodiment. Thereafter, in step S303, the electronic apparatus selects one of the first candidate adjustment routes as the target adjustment route of the preset control condition set.

In some embodiments, the step S303 selects the target adjustment route from the first candidate adjustment routes according to a target condition so that the historical yield value corresponding to the last adjustment control condition set of the selected target adjustment route complies with the target condition. For example, the target condition may be the largest historical yield related value (which means that the objective is to select a target adjustment route that can maximize the preset yield related value). In this case, the step S303 selects the first candidate adjustment route whose last adjustment control condition set corresponds to the largest historical yield related value as the target adjustment route. As another example, the target condition may be a historical yield related value with a specific value or within a specific range. In this case, the step S303 selects a first candidate adjustment routes whose last adjustment control condition set corresponds to a historical yield related value with the specific value or within the specific range as the target adjustment route.

In some embodiments, the determination method further calculates an adjustment benefit of each of the first candidate adjustment routes after executing the step S301. For example, the determination method may calculate each of the adjustment benefits according to the preset yield related value, the historical yield related value that corresponds to the last adjustment control condition set of each of the first candidate adjustment routes, and an adjustment cost of each of the first candidate adjustment routes. Furthermore, each of the adjustment costs may be related to a control factor number of the adjustment set of the last adjustment control condition set of the first candidate adjustment route corresponding to the adjustment cost. Thereafter, the determination method executes the step S303 for selecting the target adjustment route from the first candidate adjustment routes by finding out the one whose adjustment benefit complies with the target condition.

Figure 3B:
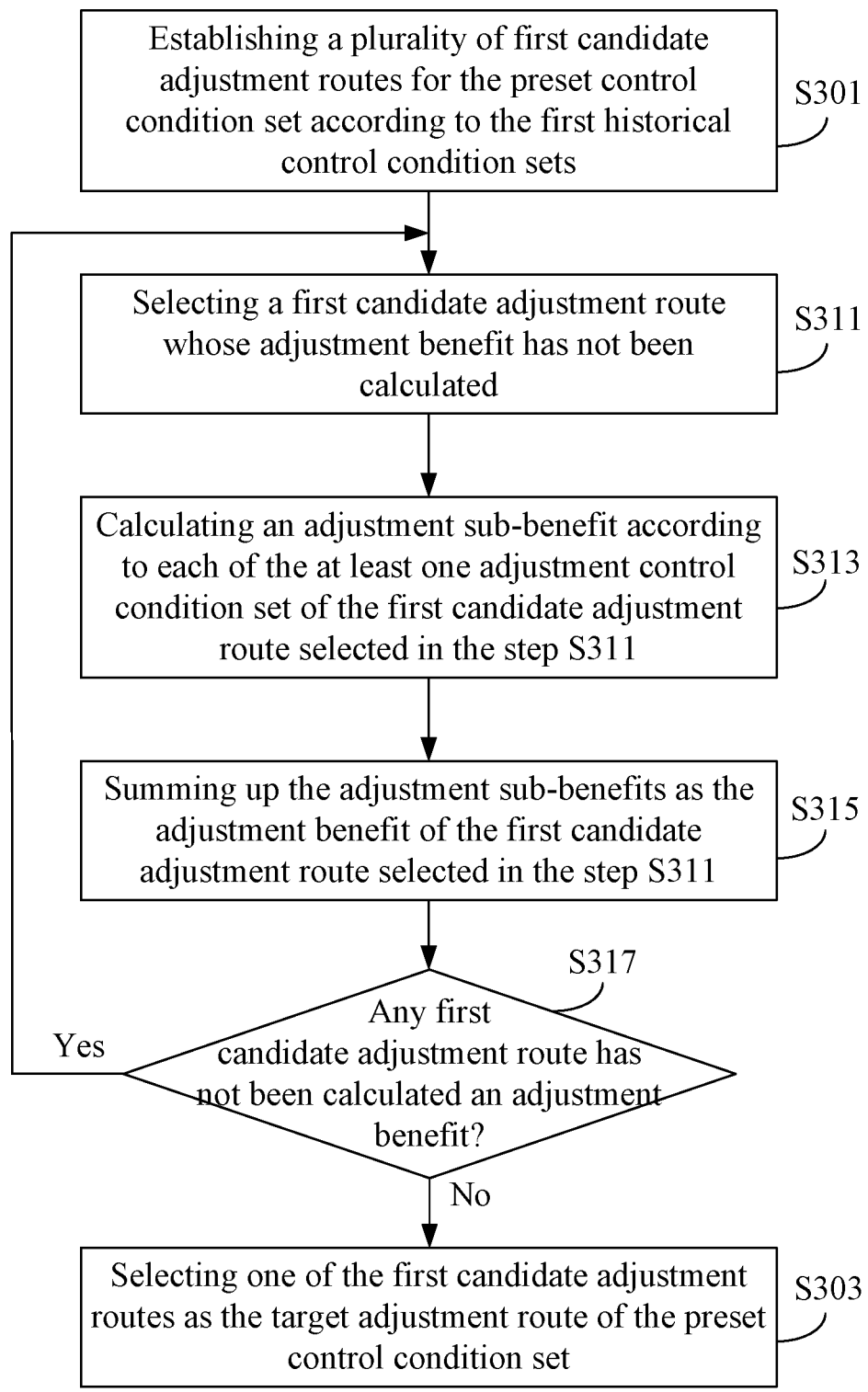
FIG. 3B is a flowchart depicting some embodiments of the present invention.

In some embodiments, the determination method may execute the flowchart as shown in FIG. 3B. In these embodiments, after executing the step S301, the determination method calculates the adjustment benefit of each of the first candidate adjustment routes by taking all the adjustment control condition sets included in the first candidate adjustment route into consideration. Specifically, in step S311, the electronic apparatus selects a first candidate adjustment route whose adjustment benefit has not been calculated. In step S313, the electronic apparatus calculates an adjustment sub-benefit according to each of the at least one adjustment control condition set of the first candidate adjustment route selected in the step S311. Next, in step S315, the electronic apparatus sums up the adjustment sub-benefits as the adjustment benefit of the first candidate adjustment route selected in the step S311. In step S317, the electronic apparatus determines whether any first candidate adjustment route has not been calculated an adjustment benefit. If the determination result of the step S317 is yes, the determination method executes the step S311 to S317 again. If the determination result of the step S317 is no, the step S303 is executed by the electronic apparatus to select one of the first candidate adjustment routes whose adjustment benefit complies with the target condition as the target adjustment route of the preset control condition set.

It shall be appreciated that, in some embodiments, each of the adjustment sub-benefits is related to one of or a combination of the historical yield related value and an adjustment cost of the corresponding adjustment control condition set. Moreover, in some embodiments, each of the adjustment costs corresponds to a cost function, and the cost functions are not all the same.

In some embodiments, the determination method determines whether a first candidate adjustment route complies with a target condition every time a first candidate adjustment route is established. If the first candidate adjustment route complies with the target condition, the determination method selects the first candidate adjustment route as the target adjustment route. If the first candidate adjustment route does not comply with the target condition, the determination method further establishes another first candidate adjustment route and then determines whether the another first candidate adjustment route complies with the target condition. The determination method repeats the aforesaid steps until a candidate adjustment route complying with the target condition is found as the target adjustment route.

Figure 3C:
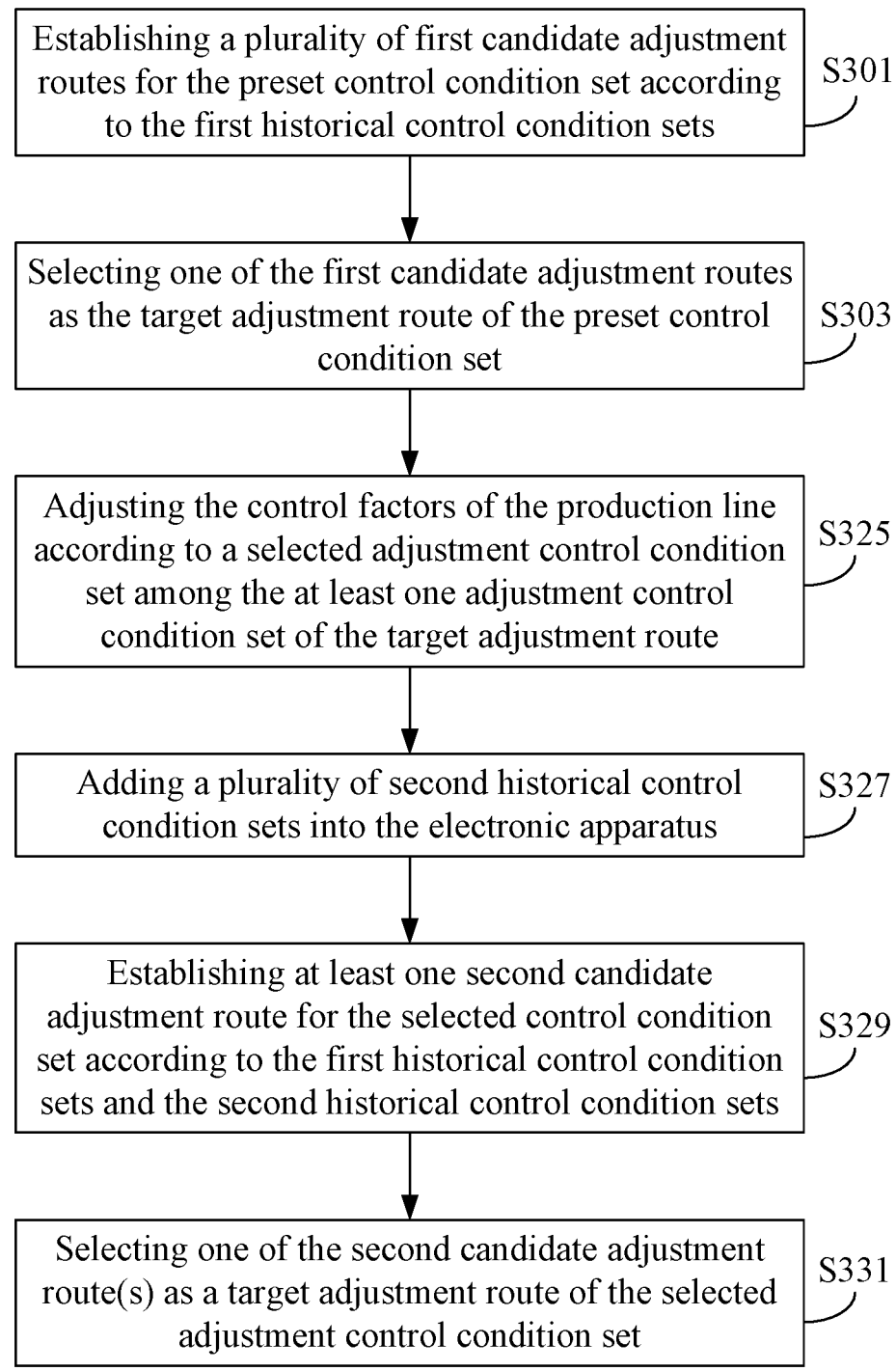
FIG. 3C is a flowchart depicting some embodiments of the present invention.

In some embodiments, the determination method may execute the flowchart as shown in FIG. 3C. In these embodiments, after the steps S301 and S303, the determination method executes the step S325 to adjust, by the electronic apparatus, the control factors of the production line according to a selected adjustment control condition set among the at least one adjustment control condition set of the target adjustment route. In step S327, a plurality of second historical control condition sets (e.g., a plurality of historical control condition sets $12a, 12b, \ldots, 12x$ shown in FIG. 2A) are added into the electronic apparatus, wherein each of the second historical control condition sets comprises a historical yield related value and a plurality of historical control conditions corresponding to the control factors one-to-one. Next, step S329 is executed by the electronic apparatus to establish at least one second candidate adjustment route (e.g., the candidate adjustment routes $22a, 22b, \ldots, 22c$ shown in FIG. 2B) for the selected control condition set according to the first historical control condition sets and the second historical control condition sets. It shall be appreciated that each of the second candidate adjustment routes established for the selected adjustment control condition set by the step S329 have to comply with the two conditions described in the first embodiment. Thereafter, step S331 is executed by the electronic apparatus to select one of the second candidate adjustment route(s) as a target adjustment route of the selected adjustment control condition set.

It shall be additionally appreciated that, after the step S327, the electronic apparatus determines that the historical control conditions have been updated. Therefore, the electronic apparatus establishes candidate adjustment routes according to the first historical control condition sets and the second historical control condition sets and selects one from the candidate adjustment routes as the target adjustment route of the selected adjustment control condition set. Briefly speaking, the present invention may adopt the aforesaid steps to update the target adjustment route of the production line, and the number of times for updating the target adjustment route is not limited.

In addition to the aforesaid steps, the fourth embodiment can execute all the operations and steps of the determination apparatus 1 and the determination apparatus 2 described in the first, second, and third embodiments, have the same functions, and deliver the same technical effects as the first, second, and third embodiments. How the fourth embodiment executes these operations and steps, has the same functions, and delivers the same technical effects as the first, second, and third embodiments will be readily appreciated by those of ordinary skill in the art based on the explanation of the first, second, and third embodiments. Thus, the details will not be repeated herein.

It shall be appreciated that, in the specification and the claims of the present invention, the terms "first" and "second" used in the first historical control condition set and the second historical control condition set are only used to mean that these historical control condition sets are obtained at different stages. Moreover, the terms "first" and "second" used in the first candidate adjustment route and the second candidate adjustment route are only used to mean that these candidate adjustment routes are established at different stages.

According to the above descriptions, the present invention establishes a plurality of candidate adjustment routes complying with two specific conditions for a preset control condition set of a production line according to the historical control condition sets and selects one of the candidate adjustment routes as the target adjustment route according to different strategies. With the two specific conditions, no matter which candidate adjustment route is selected, the yield related values of the production line will be gradually improved by adjusting the control factors gradually according to the adjustment order formed by the at least one adjustment control condition included in the candidate adjustment route. Moreover, no matter which candidate adjustment route is selected, the control factors of the production line can be adjusted gradually, and each step adjusts one or few more control factors.

With the aforesaid mechanism, the technology provided by the present invention can select a target adjustment route for adjusting the preset control condition set of the production line under the consideration of the cost and the benefit and then gradually adjust the control factors of the production line to the corresponding control conditions according to an adjustment order of the target adjustment route. Thus, the present invention can gradually improve the yield related values of the production line, and the huge burden of the production line caused by adjusting too many control factors at one time can be avoided.

The above disclosure is only utilized to enumerate partial embodiments of the present invention and illustrated technical features thereof, but not to limit the scope of the present invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for determining a target adjustment route for a preset control condition set of a production line, comprising:
   a storage, being configured to store the preset control condition set and a plurality of first historical control condition sets, wherein the preset control condition set comprises a preset yield related value and a plurality of preset control conditions corresponding to a plurality of control factors one-to-one, each of the first historical control condition sets comprises a historical yield related value and a plurality of historical control conditions corresponding to the control factors one-to-one; and
   a processor electrically connected to the storage, being configured to establish at least one first candidate adjustment route for the preset control condition set according to the first historical control condition sets, wherein each of the at least one first candidate adjustment route includes at least one adjustment control condition set arranged in an adjustment order, and each of the at least one adjustment control condition set is one of the first historical control condition sets,
   wherein the historical yield related value corresponding to the first adjustment control condition set of each of the at least one first candidate adjustment route is greater than the preset yield related value, and the historical yield related values corresponding to the adjustment control condition sets within the same first candidate adjustment route increase in the adjustment order,
   wherein each of the at least one adjustment control condition set of each of the at least one first candidate adjustment route has an adjustment set with respect to the preset control condition set, the at least one historical control condition included in each of the adjustment sets is different from the at least one preset control condition corresponding to the adjustment set, and the adjustment set of each of the adjustment control condition sets is a proper subset of the adjustment set of the next adjustment control condition set in the same first candidate adjustment route, and
   wherein the processor further selects one of the at least one first candidate adjustment route as the target adjustment route.

2. The apparatus of claim 1, wherein the historical yield related value corresponding to the last adjustment control condition set of the target adjustment route complies with a target condition.

3. The apparatus of claim 1, wherein each of the historical yield related values is one of a yield rate, a yield, and a combination thereof.

4. The apparatus of claim 1, wherein the processor further calculates an adjustment benefit of each of the at least one first candidate adjustment route, and the adjustment benefit of the target adjustment route complies with a target condition.

5. The apparatus of claim 4, wherein the processor calculates each of the at least one adjustment benefit according to the preset yield related value, the historical yield related value corresponding to the last adjustment control condition set of each of the at least one first candidate adjustment route, and an adjustment cost corresponding to each of the at least one first candidate adjustment route.

6. The apparatus of claim 5, wherein each of the at least one adjustment cost is related to a control factor number of the adjustment set of the last adjustment control condition set of the corresponding first candidate adjustment route.

7. The apparatus of claim 1, wherein the processor further performs the following operations on each of the at least one first candidate adjustment route:
   calculating an adjustment sub-benefit for each of the at least one adjustment control condition set of the first candidate adjustment route, and
   summing up the at least one adjustment sub-benefit as an adjustment benefit,
   wherein the adjustment benefit of the target adjustment route complies with a target condition.

8. The apparatus of claim 7, wherein each of the adjustment sub-benefits is related to one of or a combination of the historical yield related value and an adjustment cost that correspond to the adjustment control condition set corresponding to the adjustment sub-benefit.

9. The apparatus of claim 8, wherein each of the adjustment costs corresponds to a cost function, and the cost functions are not all the same.

10. The apparatus of claim 1, wherein the processor further adjusts the production line according to a selected adjustment control condition set among the at least one adjustment control condition set of the target adjustment route, adds a plurality of second historical control condition sets into the storage, establishes at least one second candidate adjustment route for the selected adjustment control condition set according to the first historical control condition sets and the second historical control condition sets, and selects one of the at least one second candidate adjustment route as a target adjustment route of the selected adjustment control condition set.

11. A method for determining a target adjustment route for a preset control condition set of a production line, the method being for use in an electronic apparatus, the electronic apparatus storing the preset control condition set and a plurality of first historical control condition sets, the preset control condition set comprising a preset yield related value and a plurality of preset control conditions corresponding to a plurality of control factors one-to-one, each of the first historical control condition sets comprising a historical yield related value and a plurality of historical control conditions corresponding to the control factors one-to-one, the method comprising:

(a) establishing at least one first candidate adjustment route for the preset control condition set according to the first historical control condition sets,
wherein each of the at least one first candidate adjustment route includes at least one adjustment control condition set arranged in an adjustment order, and each of the at least one adjustment control condition set is one of the first historical control condition sets,
wherein the historical yield related value corresponding to the first adjustment control condition set of each of the at least one first candidate adjustment route is greater than the preset yield related value, and the historical yield related values corresponding to the adjustment control condition sets within the same first candidate adjustment route increase in the adjustment order,
wherein each of the at least one adjustment control condition set of each of the at least one first candidate adjustment route has an adjustment set with respect to the preset control condition set, the at least one historical control condition included in each of the adjustment sets is different from the at least one preset control condition corresponding to the adjustment set, and the adjustment set of each of the adjustment control condition sets is a proper subset of the adjustment set of the next adjustment control condition set in the same first candidate adjustment route; and (b) selecting one of the at least one first candidate adjustment route as the target adjustment route.

12. The method of claim 11, wherein the historical yield related value corresponding to the last adjustment control condition set of the target adjustment route selected in the step (b) complies with a target condition.

13. The method of claim 11, wherein each of the historical yield related values is one of a yield rate, a yield, and a combination thereof.

14. The method of claim 11, further comprising:
(c) calculating an adjustment benefit of each of the at least one first candidate adjustment route,
wherein the adjustment benefit of the target adjustment route complies with a target condition.

15. The method of claim 14, wherein the step (c) calculates each of the at least one adjustment benefit according to the preset yield related value, the historical yield related value corresponding to the last adjustment control condition set of each of the at least one first candidate adjustment route, and an adjustment cost corresponding to each of the at least one first candidate adjustment route.

16. The method of claim 15, wherein each of the at least one adjustment cost is related to a control factor number of the adjustment set of the last adjustment control condition set of the corresponding first candidate adjustment route.

17. The method of claim 11, further comprising:
performing the following operations on each of the at least one first candidate adjustment route:
calculating an adjustment sub-benefit for each of the at least one adjustment control condition set of the first candidate adjustment route; and
summing up the at least one adjustment sub-benefit as an adjustment benefit,
wherein the adjustment benefit of the target adjustment route complies with a target condition.

18. The method of claim 17, wherein each of the adjustment sub-benefits is related to one of or a combination of the historical yield related value and an adjustment cost that correspond to the adjustment control condition set corresponding to the adjustment sub-benefit.

19. The method of claim 18, wherein each of the adjustment costs corresponds to a cost function, and the cost functions are not all the same.

20. The method of claim 11, further comprising:
adjusting the production line according to a selected adjustment control condition set among the at least one adjustment control condition set of the target adjustment route;
adding a plurality of second historical control condition sets into the electronic apparatus;
establishing at least one second candidate adjustment route for the selected adjustment control condition set according to the first historical control condition sets and the second historical control condition sets; and
selecting one of the at least one second candidate adjustment route as a target adjustment route of the selected adjustment control condition set.

* * * * *